United States Patent [19]

Martinson et al.

[11] Patent Number: 5,600,132
[45] Date of Patent: Feb. 4, 1997

[54] BI-DIRECTIONAL LASER LIGHT DETECTION DEVICE HAVING A LASER LIGHT PIPE

[75] Inventors: Glen D. Martinson, Oakville; Marcus Beaumont, Burlington, both of Canada

[73] Assignee: B.E.L-Tronics Limited, Mississauga, Canada

[21] Appl. No.: 325,500

[22] Filed: Oct. 19, 1994

[51] Int. Cl.$^6$ .................................................. H01J 5/16
[52] U.S. Cl. .......................... 250/227.11; 340/936; 377/9; 342/104
[58] Field of Search .......................... 250/227.11, 227.19, 250/227.29, 227.3; 356/5.08, 28; 73/489, 9, 503, 510–512; 340/936, 937; 377/9, 17, 20; 342/104–109, 114, 53–54, 173

[56] References Cited

U.S. PATENT DOCUMENTS

| | | | |
|---|---|---|---|
| 5,359,404 | 10/1994 | Dunne | 342/105 |
| 5,491,464 | 2/1996 | Carter et al. | 342/104 |

Primary Examiner—Que T. Le
Attorney, Agent, or Firm—Donald E. Heson

[57] ABSTRACT

A bi-directional portable laser light detection device for receiving and detecting laser light from one or more of a plurality of sources includes a laser light pipe that comprises a solid body of material that has a high index of refraction and has an input end, an output end, and at least one wall member connecting the input end and the output end. A generally planar laser light admitting zone on the exterior of the solid body at the input end thereof is oriented so as to generally face the expected direction of the path of laser light from a source along a first opposed path so that, in use, the laser light enters the solid body by way of the admitting zone so as to become admitted laser light. A generally planar laser light emitting zone on the exterior of the solid body at the output end thereof is oriented so as to generally face outwardly toward a laser light sensor such that laser light emitted from the laser light emitting zone is received by a laser light sensor. The external periphery of the solid body is shaped and dimensioned so as to transmit and internally reflect the admitted laser light to the laser light emitting zone. The laser light sensor is oriented so as to receive laser light emitted from the laser light emitting zone of the laser light pipe, and also so as to receive laser light along a second opposed path.

16 Claims, 5 Drawing Sheets

BI-DIRECTIONAL LASER LIGHT DETECTION DEVICE HAVING A LASER LIGHT PIPE

FIELD OF THE INVENTION

This invention relates to laser light detection devices and more particularly to laser light detection devices for receiving and detecting laser light from two opposed directions.

BACKGROUND OF THE INVENTION

For many years, law enforcement officers have used speed indicating radar guns to monitor and record the speed of vehicles travelling on roadways. Such speed indicating radar guns emit a directed radar signal towards a target and receive a reflected or re-transmitted portion of that signal from the target. Various types of radar detection devices exist for use in a vehicle to detect the presence of radar signals from such speed indicating radar guns. However, radar detectors typically are able to sense the presence of radar signals only from one direction—usually they are place or oriented within the vehicle to sense radar being transmitted from in front of the vehicle, and they rely on reflected radar signals within the vehicle or from a preceding vehicle to sense radar signals emanating from behind the vehicle.

Early model radar speed detector "guns" were somewhat unreliable and were prone to occasionally give erroneous indications of the speed of a vehicle. Recent advances in technology have caused these radar speed detection "guns" to be generally reliable. However, they are still not 100% reliable especially in case such as where two or more vehicles are in close proximity to one another.

Resultingly, over the last few years, vehicle speed indicating devices that employ laser light, hereinafter referred to as laser light speed indicator "guns", have been developed and are now being used by law enforcement officers. Such laser light speed indicator "guns" transmit pulses of laser light at a known frequency and with a known pulse repetition rate towards an object such as a vehicle. The laser light used is coherent infrared radiation. The laser light is reflected off the vehicle, typically off the bumper or fender of a vehicle. A portion of that reflected laser light signal—the echo—is returned to the laser light speed indicator "gun", which senses this returned signal or echo. The time from the initial transmission of a pulse until it's returned echo is received is indicative of the range of the vehicle from the laser gun; and the change of range with respect to time is the velocity of the vehicle. Thus, using known electronic means, the speed of the vehicle can be calculated from the pulsed laser light signal reflected and received by the laser speed measuring apparatus.

DESCRIPTION OF THE PRIOR ART

Various types of laser light detectors, which are used in a vehicle to sense the presence of laser light signals from a laser light speed indicator "gun", are now available on the market. One fundamental problem with laser light detectors is that a single laser light sensor therein can receive light from a laser light source, such as a laser light speed detector "gun", either in front of the vehicle or behind the vehicle, but not from both directions at the same time. Typically, a uni-directional laser light detector receives laser light signals directed at the front of the vehicle; or for laser light signals that are directed at the rear of the vehicle, they may be detected if they have reflected off a vehicle immediately in front of the targeted vehicle. Laser light does not reflect in quite the same manner as radar signals within a vehicle. Although it has been shown that reflected laser light signals do retain enough signal strength and/or directional integrity so as to be detectable they tend to be weak in nature as they are scattered after reflecting off a surface such as a windshield or bumper.

In order to overcome this directionality problem inherent in prior art single sensor laser light detectors, it is possible to use two separate laser light sensors oriented so as to face in opposed directions. However, there is an increased cost factor associated with this in the extra cost of a second sensor. Further, it may be necessary to have extra detection circuitry for the second sensor.

What is needed is a way in which a single laser light sensor, or at least a single laser light sensor unit, can be used to concurrently receive laser light signals that are emitted from either of two opposed directions, both in front of a vehicle and behind a vehicle.

It is also desirable to provide a way of permitting presently available laser light sensor units to be used to detect laser light from either of two opposed directions, corresponding to the front and back of a vehicle, while necessitating minimal changes to presently developed laser light detectors.

SUMMARY OF THE INVENTION

In accordance with one aspect of the present invention, there is provided a bi-directional portable laser light detection device for receiving and detecting laser light from one or more of a plurality of sources, where each source is generally aligned along one of a first and a second opposed paths. The laser light detection device has at least one laser light sensor and associated circuitry to give warning when laser light emitted from any one of the plurality of sources within a predetermined range of wavelengths and pulse repetition rates and travelling generally along either of the first and second opposed paths—in other words, laser pulses from police laser speed detection apparatus either in front of or behind the targeted vehicle where the laser light detection device is mounted and being used—is detected. The laser detection device includes a laser light pipe that comprises a solid body having an input end, an output end, and at least one wall member connecting the input end and the output end. There is a generally planar laser light admitting zone on the exterior of the solid body at the input end thereof oriented so as to generally face the expected direction of the path of the laser light within the predetermined range of wavelengths emitted from a source along the first opposed path so that, in use, the laser light emitted from the source enters the solid body by way of the admitting zone so as to become admitted laser light. There is also a generally planar laser light emitting zone on the exterior of the solid body at the output end thereof, the generally planar laser light emitting zone being oriented so as to generally face outwardly toward the at least one laser light sensor such that the admitted laser light which will be emitted from the laser light emitting zone is received by the at least one laser light sensor. The external periphery of the solid body is shaped and dimensioned so as to transmit and internally reflect the admitted laser light within the predetermined range of wavelengths to the laser light emitting zone. The at least one laser light sensor is oriented so as to receive the admitted laser light that is emitted from the laser light emitting zone of the laser light pipe, and also so as to receive laser light within the predetermined range of wavelengths and pulse repetition rates travelling along the second opposed path.

In accordance with another aspect of the present invention, there is provided a bi-directional portable laser light detection device for receiving and detecting laser light from one or more of a plurality of sources, where each source is generally aligned along one of a first and a second opposed paths. The laser light detection device has at least one laser light sensor and associated circuitry to give warning when laser light emitted from any one of the plurality of sources within a predetermined range of wavelengths and travelling generally along either of the first and second opposed paths is detected. The laser detection device includes first and second laser light pipes, each of the laser light pipes comprising a solid body having an input end, an output end, and at least one wall member connecting the input end and the output end. There is a generally planar laser light admitting zone on the exterior of each solid body at the input end thereof and a generally planar laser light emitting zone on the exterior of each solid body at the output end thereof, the generally planar laser light emitting zone being oriented so as to generally face outwardly toward the at least one laser light sensor such that laser light within the predetermined range of wavelengths emitted from the laser light emitting zone of either solid body is received by the at least one laser light sensor. The external periphery of each solid body is shaped and dimensioned so as to transmit and internally reflect the admitted laser light to the laser light emitting zone. The at least one laser light sensor is oriented so as to receive laser light emitted from the laser light emitting zone of each of the first and second laser light pipes. The generally planar laser light admitting zone of the first laser light pipe is oriented so as to receive laser light within the predetermined range of wavelengths and emitted from a first source along the first opposed path so that, in use, the laser light emitted from the first source enters the solid body by way of the admitting zone so as to become admitted laser light. The generally planar laser light admitting zone of the second laser light pipe is oriented so as to receive laser light within the predetermined range of wavelengths from a second source along the second opposed path so that, in use, the laser light from the second source enters the solid body by way of the admitting zone so as to become admitted laser light.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Figure 1:
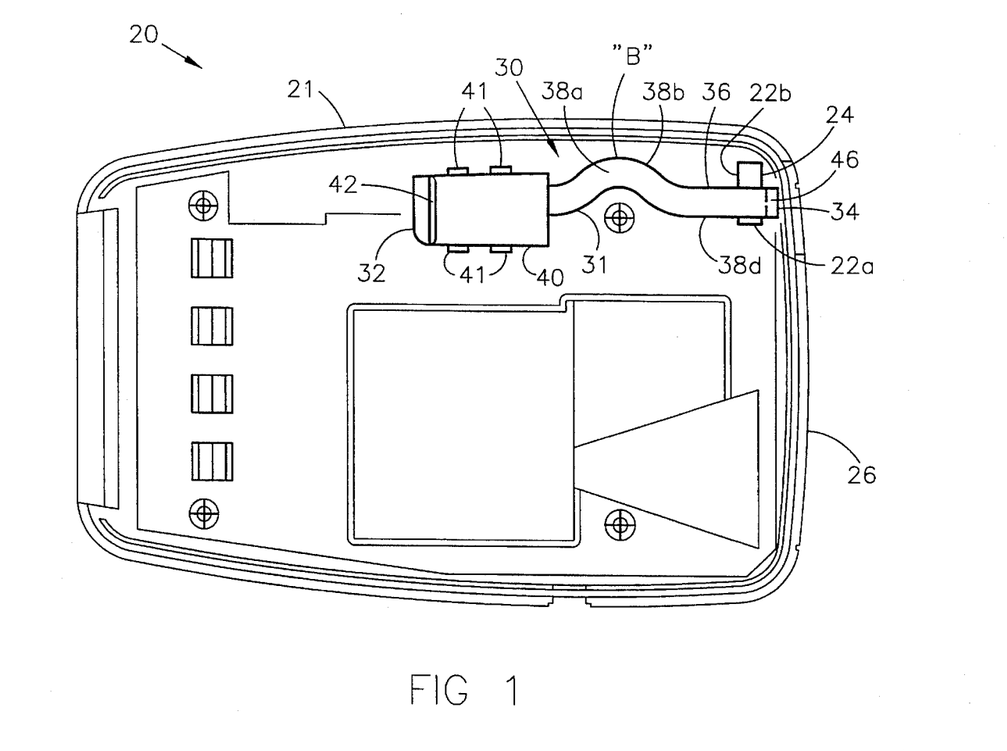
FIG. 1 is a diagrammatic top plan view of the bi-directional portable laser light detection device of the present invention, with a laser light pipe shown in heavy lining.
Figure 2:
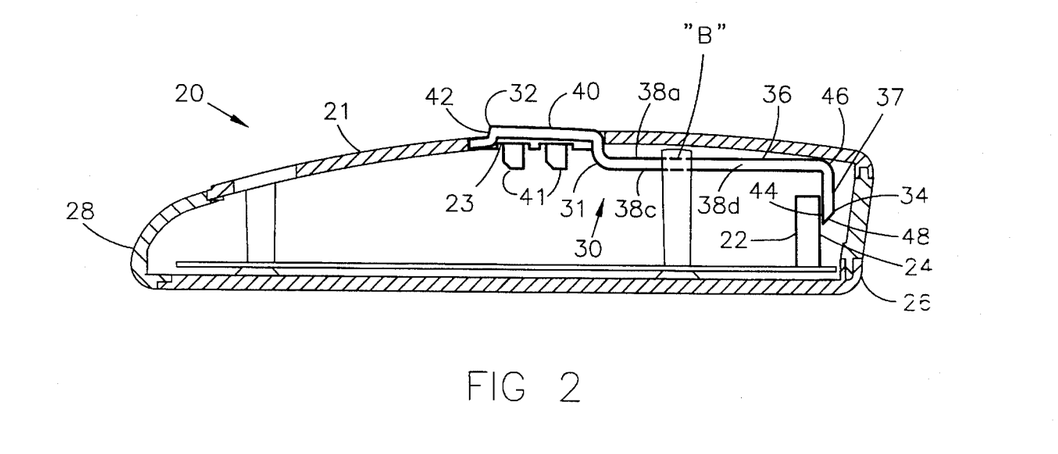
FIG. 2 is a diagrammatic side elevational view of the laser light detection device of FIG. 1.
Figure 3:
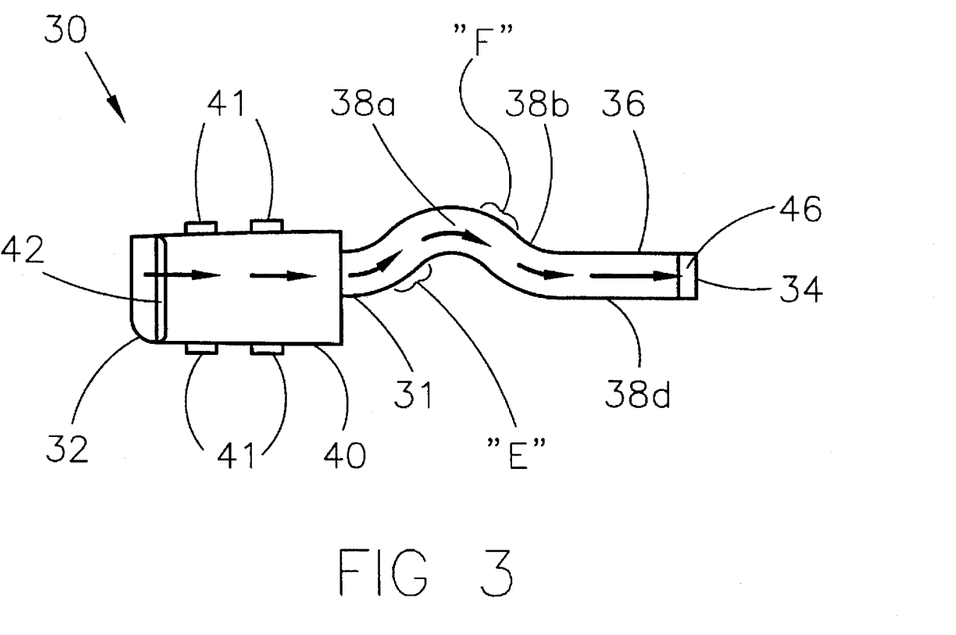
FIG. 3 is a top plan view of the preferred embodiment of the laser light pipe as shown in FIG. 1, also showing the expected general path of laser light travelling therethrough.
Figure 4:
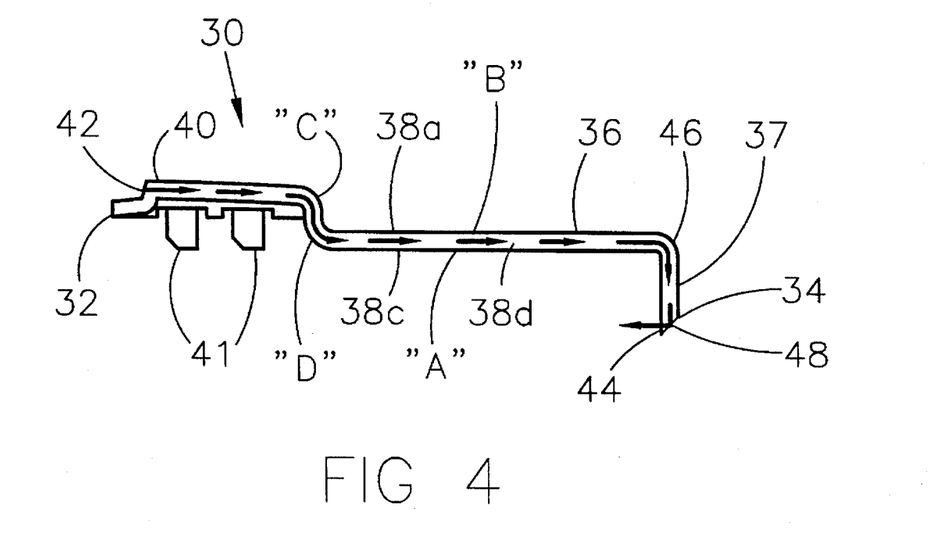
FIG. 4 is a side elevational view of the preferred embodiment of the laser light pipe as shown in FIG. 3, also showing the expected general path of laser light travelling therethrough.

Reference will now be made to FIGS. 1 to 4, which show the bi-directional portable laser light detection device 20 of the present invention in FIGS. 1 and 2, with a laser light pipe 30 of the present invention therein—also shown separately in FIGS. 3 and 4. The laser light detection device 20 of the present invention is intended for use in a vehicle (not shown) for receiving and detecting laser light from one or more of a plurality of sources. The end of the laser light detection device 20 that would normally be generally aligned towards the front end of the vehicle will be considered the front end 26 of the laser light detection device. The opposite other end of the laser light detection device 20 will be considered the back end 28. The sources must be oriented along one of either a first and second opposed paths, which would correspond to being behind the vehicle and being in front of the vehicle, respectively. The laser light must be within a predetermined range of wavelengths and predetermined pulse repetition rates so as to be recognizable by the laser light detection device 20. This laser light within a predetermined range of wavelengths and pulse repetition rates must be travelling generally along either of the first and second opposed paths in order to be detected. It should be understood that the term "generally aligned" in terms of a source of laser light along either of the first and second opposed paths refers to a source of laser light located along a linear axis or off-axis by an angular amount up to about 20°.

The laser light detection device 20 also has at least one laser light sensor 22 so as to detect the laser light. In the preferred embodiment, there are actually two laser light sensors 22a and 22b arranged in side-by-side relation at the front of the laser light detection device 20. The sensors 22a and 22b are generally encapsulated in a tinted material adapted to transmit the laser light and to filter out other frequencies of light other than the predetermined frequency range of laser light that is to be detected. The one sensor 22b is directly open to the front of the laser light detection device 20 such that laser light from a source along the second opposed path can directly reach the sensor 22b. The other sensor 22a receives light reflected by the laser light pipe 30, as will be detailed subsequently.

The portable laser light detection device 20 also has associated electronic circuitry (not shown) electrically coupled to the laser light sensors 22a and 22b to give warning when laser light within the predetermined range of wavelengths and pulse repetition rates emitted from any one of a plurality of sources and travelling generally along either of the first and second opposed paths, is detected.

The laser light detection device 20 also comprises a laser light pipe 30 that is used to redirect laser light from one or more sources along the first opposed path, which corresponds to a source directed at the rear of the vehicle, to the sensors 22a (in this case). The laser light pipe 30 comprises a solid body 31 having an input end 32, an output end 34, and four wall members 38a, 38b, 38c, and 38d connecting the input end 32 to the output end 34. In the preferred embodiment, the laser light pipe 30 is substantially rectangular in cross-section. The laser light pipe 30 could readily be square in cross-section, or alternatively the laser light pipe 30 could be circular in cross-section, in which case the periphery of the laser light pipe 30 is defined by one wall member connecting the input end 32 and the output end 34.

Preferably, the laser light pipe 30 is made from a material that is transparent at least to light of the predetermined laser wavelength, such as LEXAN® polycarbonate resin, which has an index of refraction of about 1.586. In any event, the material should have a high index of refraction—above about 1.414—so as to allow for total internal reflection of laser light at angles of incidence of at least 45°, so as to permit total internal reflection at angle changes of 90°, and to thereby permit a change of direction of 180° of a ray of laser light to be accomplished by way of only two reflections. A change in direction of 180° is important as the direction of laser light along the second opposed path—coming from the rear of the vehicle—and the direction that the sensor 22a faces are the same, which means that the laser light coming along the second opposed path must be "turned around", preferably so as to strike directly against—that is to say perpendicularly to—the sensor 22a.

Total internal reflection of an incident ray of light occurs when that ray of light strikes the surface of a medium—the surface being defined as a change in media—so as to remain internal within that medium. Total internal reflection occurs for angles of incidence greater than the critical angle, which critical angle is measured with respect to a line normal to the surface. The critical angle, commonly referred to in science by the letter "k" is calculated from the relation:

$$\mathrm{Sin}(k) = \frac{N_i}{N_d}$$

Where    $N_i$ = index of refraction of air = 1

$N_d$ = index of refraction of LEXAN ® resin = 1.586

Hence    $\mathrm{Sin}(k) = \frac{N_i}{N_d} = \frac{1}{1.586} = 0.6305$ Therefore    $k = 39.07°$ (as determined from a Sine Table)

It can therefore be calculated that total internal reflection of light occurs when the angle between the ray of light and the surface of the medium is less than about 51° (90° −39°=51°).

Preferably the polycarbonate resin material is tinted so as to preclude the passage of other wavelengths of light other than the laser light of the predetermined frequency. Also, such colouring permits the laser light pipe 30 to be of a dark colour so as to match, or at least nearly match, the colour of the case 21 of the laser light detection device 20. Usually, the polycarbonate resin is tinted so as to admit the infrared laser beam at its frequency.

Located at the input end 32 of the solid body of the laser light pipe 30 is a head element 40, of which, at least a portion is disposed at the exterior of the laser light detection device 20 outside of the case 21. In a preferred embodiment, the part of the head element 40 that is exterior to the case 21 of the laser light detection device 20 may have a textured surface, preferably similar to the type of surface as the case 21 of the laser light detection device 20, so as to appear similar to the case 21. The generally planar laser light admitting zone 42 generally faces the expected directed of the path of laser light emitted from a source along the first opposed path so that, in use, this laser light enters the solid body by way of the admitting zone 42 so as to become admitted laser light.

The head element 40 has a plurality of clip members 41 extending downwardly therefrom. These clip members 41 are shaped and dimensioned to engage part of the case 21 of the laser light detection device 20 in the form of flange members 23 which are integral with the case 21. In this manner, the laser light pipe 30 is securely retained in proper orientation and location within the laser light detection device 20.

Located at the output end 34 of the solid body of the laser light pipe 30 is a generally planar laser light emitting zone 44, disposed at the exterior thereof. The generally planar laser light emitting zone 44 is oriented so as to generally face outwardly toward the laser light sensor 22a. In the preferred embodiment, the generally planar laser light emitting zone 44 and the laser light sensor 22a—or at least the lens 24—are juxtaposed to each other and generally parallel to each other, so as to even be touching each other. In this manner, the admitted laser light that is ultimately emitted from the laser light emitting zone 44 is received by the laser sensor 22. It can be seen that the laser light admitting zone 42 and the laser light emitting zone 44 face substantially in the same direction.

As can readily be seen in FIGS. 1 through 4, the external periphery of the light pipe—that is to say, the defining walls of the solid body—is shaped and dimensioned so as to transmit and totally internally reflect the admitted laser light within the solid body from the laser light admitting zone 42 to the laser light emitting zone 44. Towards the output end 34 of the solid body of the light pipe 30 is a generally planar first light reflecting surface 46 and a second generally planar light reflecting surface 48 interposed seriatim between the laser light admitting zone 42 and the laser light emitting zone 44. The first laser light reflecting surface 46 is positioned so as to reflect laser light admitted by way of the laser light admitting zone 42 towards the second laser light reflecting surface 48. The second generally planar light reflecting surface 48 is positioned so as to reflect laser light reflected by the first laser reflecting surface, towards the laser light emitting zone 44. The first laser light reflecting surface 46 and the second generally planar light reflecting surface 48 are oriented at about 45° to the general orientation of light travelling along the laser light pipe 30 as indicated by arrow "A", as shown in FIGS. 3 and 4. This angle of 45° is less than the critical angle of 51° between the ray of light and the "reflecting" surface. Accordingly, there is substantially total internal reflection of the light travelling along the solid body of the light pipe 30.

The laser light pipe 30 as shown in the preferred embodiment, has a curved portion at "B", which curved portion is required to get around an internal structural element of the of the case 21. Preferably, the radius of curvature of any curved portion at any point along the length of the solid body 31 of the laser light pipe 30, is of a radius of curvature greater than or equal to three times—that is to say at least three times—the width of the laser light pipe 30 at the curve. In this manner, the angle of incidence of any admitted light within the laser light pipe 30 will have an angle of incidence with respect to a curved wall of less than the critical angle of 51° (for LEXAN®), thus providing total internal reflection of any admitted light.

Reference will now be made to FIGS. 3 and 4 in order to illustrate the general path of laser light within the preferred embodiment of the laser light pipe 30. In use, it can be seen that laser light of the predetermined frequency travelling along said first opposed path enters the laser light admitting zone 42 so as to become admitted laser light. The admitted laser light then reflects off the top wall 38a of the solid body 31 of the laser light pipe 30 at "C", whereat the admitted laser light is reflected out of the head element 40 and then is redirected by this curved surface so as to travel towards the next curved surface at "D". The laser light is then reflected off the curved surface at "D" so as to travel off the curved portion of the side wall of the solid body approximately at the location marked "E". This reflected laser light is then reflected off the other wall approximately at the location marked "F" and then continues toward the output end 34 of the light pipe 30, along the first elongate straight portion 36 of the solid body 31 to the first laser light reflecting surface 46. The laser light reflecting surface 46 reflects this laser light along the second elongate straight portion 37 to the second laser light reflecting surface 48, which in turn reflects the laser light out of the solid body of the laser light pipe 30 through the laser light emitting zone 44. In actuality, the laser light is reflected by a curved surface, the laser light is no longer parallel and most of the laser light will be then travelling at an angle to sides of the solid body of the laser light pipe 30 and accordingly will reflect off the sides of the solid body as the laser light travels toward the output end 34 thereof. It is therefore possible that some of the emitted laser light might strike portions of the walls of the laser light pipe 30 at an angle that is greater than the critical angle measured for the surface of the light pipe, so that total internal reflection does not occur. Therefore, a small amount of light might perhaps exit the laser light pipe 30 before reaching the laser light emitting zone 44 at the output end 34.

In the above described manner, the laser light pipe 30 has taken the laser light travelling along the first opposed path and has redirected it by about 180° so as to be directed towards the sensor 22. Concurrently, the other sensor 22 receives light directly from a source along the second opposes path. In this manner, the laser light pipe 30 allows the portable laser light detection device 20 to be a bi-directional laser light detection device 20.

Figure 5:
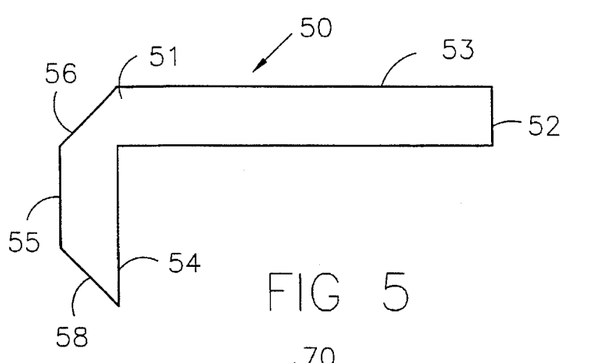
FIG. 5 is a side elevational view of an alternative embodiment laser light pipe.

In an alternative embodiment, as shown in FIG. 5, the solid body 51 of the laser light pipe 50 is substantially L-shaped and includes a first generally straight portion 53 between the laser light admitting zone 52 and the first laser light reflecting surface 56, and also includes a second generally straight portion 55 between the first laser light reflecting surface 56 and the second light reflecting surface 58. Laser light enters the laser light pipe 50 through the laser light admitting zone 52, travels along the first generally straight portion 53 and then strikes the first laser light reflecting surface 56 so as to be redirected toward the second laser light reflecting surface 58, reflects off the second laser light reflecting surface 58 so as to be redirected toward the laser light emitting zone 54, and then exits the laser light pipe through the laser light emitting zone 54.

Figure 6:
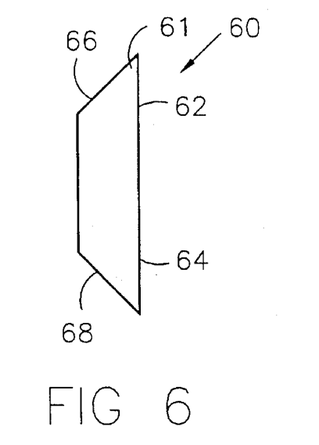
FIG. 6 is a side elevational view, similar to FIG. 5, of another alternative embodiment laser light pipe.

In another alternative embodiment, as shown in FIG. 6, the laser light pipe 60 has a solid body 61 that is basically a straight shape wherein the laser light admitting zone 62 is adjacent the first laser light reflecting surface 66 and the laser light emitting zone 64 is adjacent the second laser light reflecting surface 68. Light enters the laser light pipe 60 through the laser light admitting zone 62, almost immediately strikes the first laser light reflecting surface 66 so as to be redirected toward the second laser light reflecting surface 68, reflects off the second laser light reflecting surface 68 so as to be redirected toward the laser light emitting zone 64, and then exits the laser light pipe through the laser light emitting zone 64.

Figure 7:
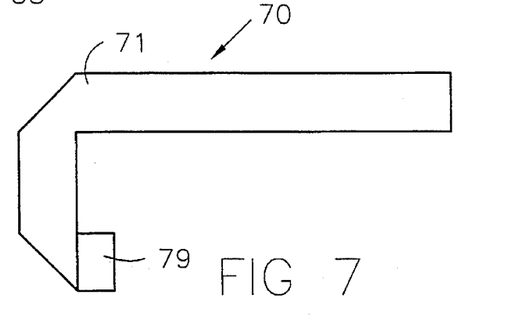
FIG. 7 is a side elevational view, similar to FIG. 5, of yet another alternative embodiment laser light pipe.

In another alternative embodiment, as shown in FIG. 7, a laser light pipe 70 similar to the laser light pipe 50 shown in FIG. 5, but with the solid body portion 71 of the laser light pipe 70 integral with the lens 79 that is immediately in front of the sensors 22a and 22b. In this case, the lens 79 is obviously not integral with the sensors 22a and 22b.

Figure 8:
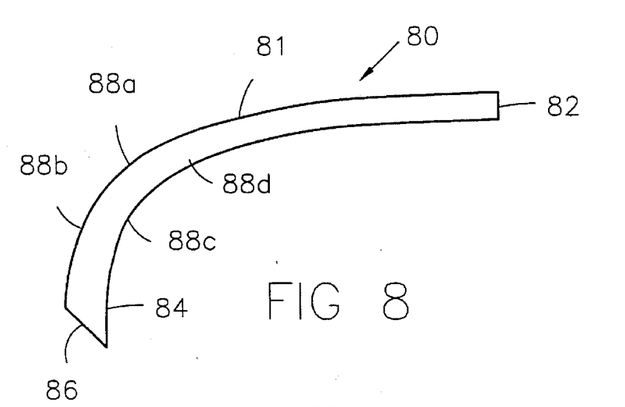
FIG. 8 is a side elevational view, similar to FIG. 5, of yet another alternative embodiment laser light pipe.

In another alternative embodiment, as shown in FIG. 8, the solid body portion 81 of the laser light pipe 80 is curved between the laser light admitting zone 82 and the first laser light reflecting surface 86 so that laser light entering the laser light pipe 80 through the laser light admitting zone 82, reflects off the walls 88a, 88b, 88c, and 88d all of the way along the solid body portion 81 so as to reach the first laser light reflecting surface 86. The first laser light reflecting surface 86 reflects this laser light out of the laser light pipe 80 through the laser light emitting zone 84. It can be seen, that each ray of admitted laser light reflects off the wall 88a perhaps two, three, or even four, times before it reaches the first laser light reflecting surface 86 and might even reflect off the opposite wall 88c of the solid body 81. As discussed earlier, the radius of curvature of the solid body 81 at any point therealong must be three times the thickness of the solid body 81 at that point.

Figure 9:
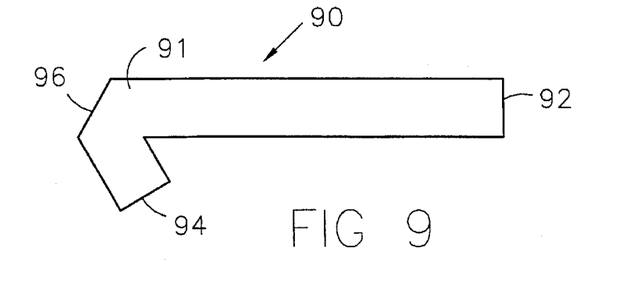
FIG. 9 is a side elevational view, similar to FIG. 5, of yet another alternative embodiment laser light pipe.

In yet another alternative embodiment, as can be seen in FIG. 9, the solid body 91 of the laser light pipe 90 has a laser light emitting zone 94 that terminates at a distance from the laser light sensor 22. The laser light enters the laser light pipe 90 through the laser light admitting zone 92, is reflected off the first laser light reflecting surface 96, and then travels to the laser light emitting zone 94 where the laser light is emitted so as to travel to the sensor 22. In this case, the first laser light reflecting surface 96 is at an angle such that the laser light entering the laser light admitting zone 92 is reflected so as to change its direction by about 150°. Accordingly, total internal reflection does not take place. The advantage of this shape of solid body 91 where the laser light emitting zone 94 is not immediately in front of the sensors 22a and 22b is that it allows only a single sensor 22 to be used to receive this reflected laser light that originates from a source along the first opposed path and also to directly receive laser light from a source along the second opposed path, thus eliminating the need for two sensors 22a and 22b. It is also possible to have a laser light pipe of a similar configuration with a laser light emitting zone terminating at a distance away from the sensor 22 or sensors 22a and 22b, but with two reflecting surfaces so as to thereby maintain total internal reflection of the admitted laser light.

Figure 10:
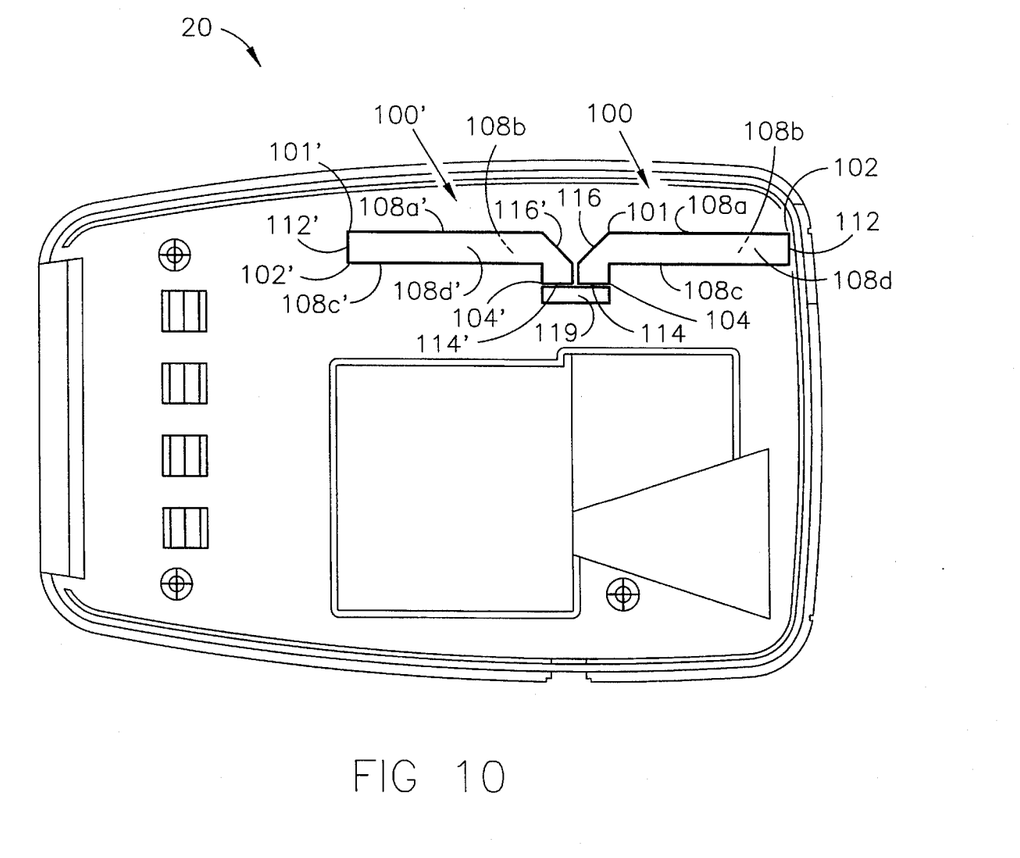
FIG. 10 is a diagrammatic top plan view of an alternative embodiment of the bi-directional portable laser light detection device of the present invention, with an alternative embodiment laser light pipe shown in heavy lining.

FIG. 10 shows an alternative embodiment of the bi-directional portable laser light detection device 20 of the present invention, which employs a first laser light pipe 100 and a second laser light pipe 100'. Each of the laser light pipes 100 and 100' comprises a solid body 101 or 101' having an input end 102 or 102', an output end 104 or 104', and wall members 108a through 108d and 108a' through 108d' connecting the respective input ends 102 or 102' with the respective output ends 104 and 104'. The cross-section of each solid body 101 or 101' may be rectangular, square, circular, or any other appropriate shape. There is a respective laser light admitting zone 112 or 112' at the respective input end 102 or 102' of each of the laser light pipes 100 and 100', with the laser light admitting zone 112 of the first laser light pipe 100 being oriented so as to receive laser light from a source along the first opposed path, and the laser light admitting zone 112' of the second laser light pipe 100' being oriented so as to receive laser light from a source along the second opposed path. The laser light emitting zones 114 and 114' of each of the first and second laser light pipes 100 and 100', respectively, are oriented so as to face generally outwardly towards the laser light sensor 119 so that laser light emitted from the respective laser light emitting zones 114 and 114' is received by the laser light sensor 119. In use, the laser light from a source along the first opposed path, which corresponds to a source direct at the rear of the vehicle, enters the first light pipe 100' through the laser light admitting zone 112', reflects off the laser light reflecting surface 116', and exits the laser light pipe 100' through the laser light emitting zone 114'. Similarly, laser light from a source along the second opposed path, which corresponds to a source directed at the front of the vehicle, enters the second laser light pipe 100 through the laser light admitting zone 112, reflects off the laser light reflecting surface 116 and exits the laser light pipe 100 through the laser light emitting zone 114 so as to reach the sensor 119. In this manner, it is possible to use only one sensor 119 to detect laser light from a source along either of the first and second opposed directions.

Figure 11:
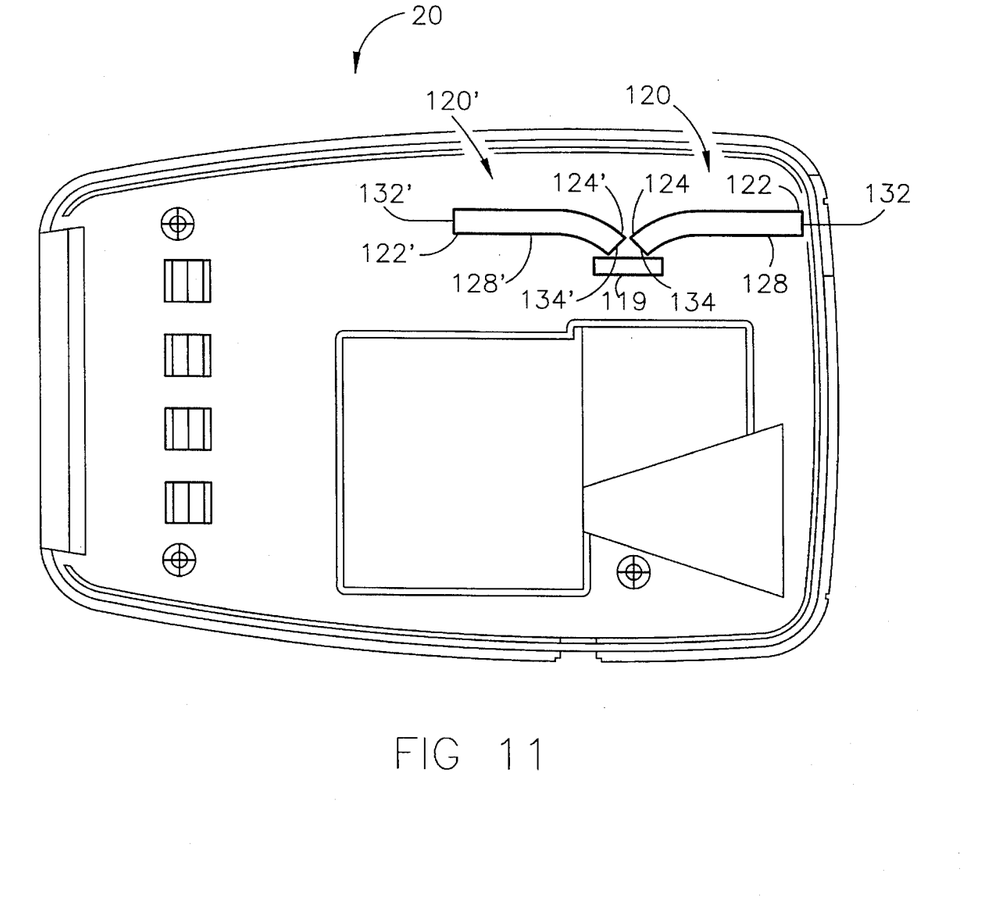
FIG. 11 is a diagrammatic top plan view of another alternative embodiment of the bi-directional portable laser light detection device of the present invention, with an alternative embodiment laser light pipe shown in heavy lining.

FIG. 11 shows yet another alternative embodiment of the bi-directional portable laser light detection device 20 of the present invention, which employs a first laser light pipe 120 and a second laser light pipe 120'. Each of the laser light pipes 120 and 120' comprises a solid body 121 or 121' having an input end 122 or 122', an output end 124 or 124', and wall members 128 through 128' connecting the respective input ends 122 or 122' with the respective output ends 124 or 124'. The cross-section of each solid body 121 or 121' is preferably circular, but may alternatively be of any appropriate shape. There is a respective laser light admitting zone 132 or 132' at the respective input end 122 or 122' of each of the laser light pipes 120 or 120', with the laser light admitting zone 132 of the first laser light pipe 120 being oriented so as to receive laser light from a source along the first opposed path, and the laser light admitting zone 132' of the second laser light pipe 120' being oriented so as to receive laser light from a source along the second opposed path. Laser light emitting zones 134 and 134' of each of the first and second laser light pipes 120 and 120', respectively, are oriented so as to face generally outwardly towards the laser light sensor 119 so that the laser light emitted from the respective laser light emitting zones 134 and 134' is received by the laser light sensor 119. In use, the laser light from a source along the first opposed path, which corresponds to a source directed at the rear of the vehicle, enters the first laser light pipe 120' through the laser light admitting zone 132', reflects off the wall members 128', and exits the laser light pipe 120' through the laser light emitting zone 134'. Similarly, laser light from a source along the second opposed path, which corresponds to the in front of the vehicle, enters the second laser light pipe 120 through the laser light admitting zone 132, reflects off the wall members 128 and exits the laser light pipe 120 through the laser light emitting zone 134 so as to reach the sensor 119. In this manner, it is possible to use only one sensor 119 to detect laser light from a source along either of the first and second opposed directions.

Other modifications and alterations may be used in the design and manufacture of the mechanical security apparatus of the present invention without departing from the spirit and scope of the accompanying claims.

What is claimed is:

1. A bi-directional portable laser light detection device for receiving and detecting laser light from one or more of a plurality of sources, where each source is generally aligned along one of a first and a second opposed paths, said laser light detection device having at least one laser light sensor and associated circuitry to give warning when laser light emitted from any one of said plurality of sources within a predetermined range of wavelengths and pulse repetition rates and travelling generally along either of said first and second opposed paths is detected, wherein said laser detection device includes a laser light pipe, said laser light pipe comprising:

a solid body having an input end, an output end, and at least one wall member connecting said input end and said output end;

a generally planar laser light admitting zone on the exterior of said solid body at said input end thereof oriented so as to generally face the expected direction of the path of said laser light within said predetermined range of wavelengths and pulse repetition rates emitted from a source along said first opposed path so that, in use, said laser light emitted from said source enters said solid body by way of said admitting zone so as to become admitted laser light; and a generally planar laser light emitting zone on the exterior of said solid body at said output end thereof, said generally planar laser light emitting zone being oriented so as to generally face outwardly toward said at least one laser light sensor such that said admitted laser light will be emitted from said laser light emitting zone and received by said at least one laser light sensor;

wherein the external periphery of said solid body is shaped and dimensioned so as to transmit and internally reflect said admitted laser light to said laser light emitting zone; and wherein said at least one laser light sensor is oriented so as to receive laser light within said predetermined range of wavelengths and pulse repetition rates emitted from said laser light emitting zone of said laser light pipe, and also so as to receive laser light within said predetermined range of wavelengths and pulse repetition rates travelling along said second opposed path.

2. The bi-directional portable laser light detection device of claim 1, wherein the index of refraction of the material of said solid body is at least 1.414.

3. The bi-directional portable laser light detection device of claim 2, wherein the index of refraction of the material of said solid body is about 1.586.

4. The bi-directional portable laser light detection device of claim 1, wherein said at least one laser light sensor is generally planar and said laser light emitting zone and said at least one laser light sensor are generally parallel to each other.

5. The bi-directional portable laser light detection device of claim 4, wherein said laser light emitting zone and said at least one laser light sensor are juxtaposed each other.

6. The bi-directional portable laser light detection device of claim 5, wherein said solid body is shaped and dimensioned such that said admitted laser light is substantially totally internally reflected to said laser light emitting zone.

7. The bi-directional portable laser light detection device of claim 6, wherein said admitted laser light is reflected more than about 150 degrees from said laser light admitting zone to said laser light emitting zone.

8. The bi-directional portable laser light detection device of claim 7, wherein said laser light pipe further comprises a generally planar first laser light reflecting surface and a generally planar second laser light reflecting surface interposed seriatim between said laser light admitting zone and said laser light emitting zone; wherein said first laser light reflecting surface is positioned so as to reflect laser light admitted at said laser light admitting zone towards said second laser light reflecting surface, and said second laser light reflecting surface is positioned so as to reflect laser light reflected by said first laser light reflecting surface towards said laser light emitting zone.

9. The bi-directional portable laser light detection device of claim 8, wherein said solid body is substantially L-shaped, and includes a first generally straight portion between said laser light admitting zone and said first laser light reflecting surface, and a second generally straight portion between said first laser light reflecting surface and said second laser light reflecting surface.

10. The bi-directional portable laser light detection device of claim 1, wherein said laser light admitting zone and said laser light emitting zone face substantially in the same direction.

11. The bi-directional portable laser light detection device of claim 1, wherein said laser light detection device is encapsulated in a material adapted to transmit laser light within said predetermined range of wavelengths and to filter out other light in other wavelengths.

12. The bi-directional portable laser light detection device of claim 1, wherein said laser light emitting zone terminates at a distance from said at least one laser light sensor so as to form a gap therebetween and such that no portion of said solid body is immediately in front of said at least one laser light sensor.

13. The bi-directional portable laser light detection device of claim 1, wherein said laser light pipe is curved along its length with the radius of curvature being at least three times the width of said laser light pipe at that curve.

14. The bi-directional portable laser light detection device of claim 1, wherein said laser light pipe further comprises a head element of which at least a portion is disposed at the exterior of said laser light detection device, with said generally planar laser light admitting zone being located on the exterior part of said head portion.

15. The bi-directional portable laser light detection device of claim 14, wherein said head portion has a plurality of clip members extending therefrom, and wherein said clip members are shaped and dimensioned to engage co-operating flange members on said laser light detection device.

16. A bi-directional portable laser light detection device for receiving and detecting laser light from one or more of a plurality of sources, where each source is generally oriented along one of a first and a second opposed paths, said laser light detection device having at least one laser light sensor and associated circuitry to give warning when laser light emitted from any one of said plurality of sources within a predetermined range of wavelengths and pulse repetition rates and travelling generally along either of said first and second opposed paths is detected, wherein said laser detection device includes first and second laser light pipes, wherein each of said laser light pipes comprises:

a solid body having an input end, an output end, and at least one wall member connecting said input end and said output end;

a generally planar laser light admitting zone on the exterior of each said solid body at said input end thereof;

wherein said generally planar laser light admitting zone of said first laser light pipe is oriented so as to receive laser light within said predetermined range of wavelengths and pulse repetition rates emitted from a first source along said first opposed path so that, in use, said laser light emitted from said first source enters said solid body by way of said admitting zone so as to become admitted laser light;

wherein said generally planar laser light admitting zone of said second laser light pipe is oriented so as to receive laser light within said predetermined range of wavelengths and pulse repetition rates from a second source along said second opposed path so that, in use, said laser light emitted from said second source enters said solid body by way of said admitting zone so as to become admitted laser light; and a generally planar laser light emitting zone on the exterior of each said solid body at said output end thereof, each said generally planar laser light emitting zone being oriented so as to generally face outwardly toward said at least one laser light sensor such that said admitted laser light in either of said first laser light pipe or said second laser light pipe will be emitted from the respective one of said laser light emitting zones and received by said at least one laser light sensor;

wherein the external periphery of each said solid body is shaped and dimensioned so as to transmit and internally reflect said admitted laser light to the respective said laser light emitting zone; and wherein said at least one laser light sensor is oriented so as to receive laser light emitted from said laser light emitting zone of each of said first and second laser light pipes.

* * * * *